F. B. ASHLEY.
POULTRY FEEDER.
APPLICATION FILED APR. 14, 1919.
1,340,869.
Patented May 25, 1920.
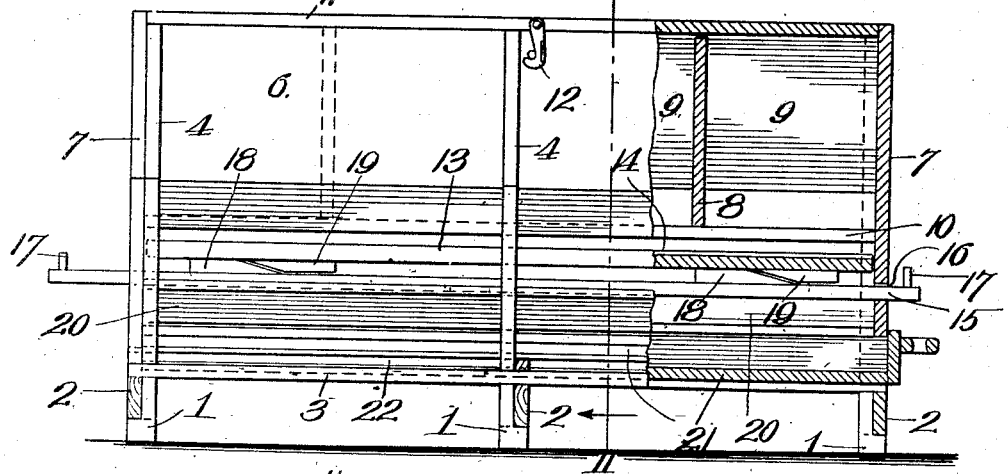
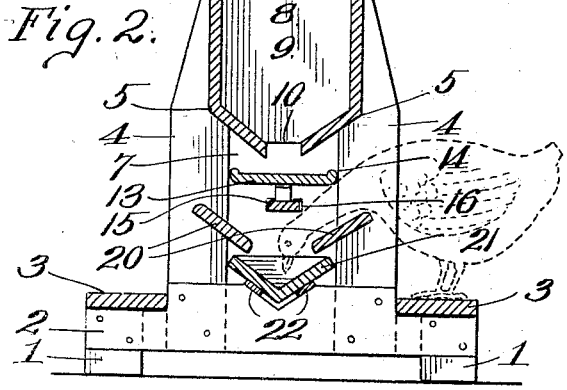
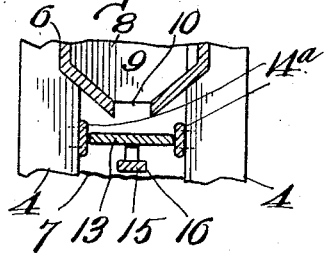
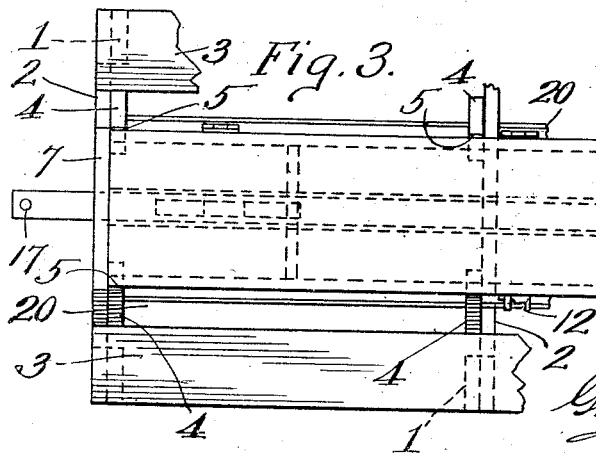
INVENTOR.
Freeland B. Ashley
BY
George H. Thorpe
ATTORNEY.

UNITED STATES PATENT OFFICE.

FREELAND B. ASHLEY, OF KANSAS CITY, MISSOURI.

POULTRY-FEEDER.

1,340,869. Specification of Letters Patent. Patented May 25, 1920.

Application filed April 14, 1919. Serial No. 290,002.

*To all whom it may concern:*

Be it known that I, FREELAND B. ASHLEY, a citizen of the United States, residing at Kansas City, in the county of Jackson and State of Missouri, have invented certain new and useful Improvements in Poultry-Feeders, of which the following is a specification.

This invention relates to poultry feeders, and more especially to that class of devices for feeding poultry without exposing the bulk of the feed to the elements, and my object is to produce a poultry feeder of this class which is sanitary in the sense that the poultry cannot scratch trash into the feed or obtain bodily access thereto such as is possible with an unprotected trough or the like. A further object is to produce a poultry feeder having a hopper and an underlying feeding table which is adjustable vertically toward and from the discharge point of the hopper for the purpose of adapting the device for use with different kinds of feed and eliminating the chance of waste thereof. A still further object is to provide a device of the character set forth, provided with an underlying trough, and guards or deflectors for guiding feed falling from the main feeding shelf into said trough, and thereby not only retaining practically all of the feed in a convenient position but also enabling a greater number of chickens to feed at the same time. A still further object is to produce an efficient poultry feeder of simple, strong, durable and cheap construction.

With the objects named in view the invention consists in certain novel and useful features of construction and combinations of parts, as hereinafter described and claimed; and in order that it may be fully understood reference is to be had to the accompanying drawing, in which:

Figure 1, represents a side elevation of a poultry feeder embodying the invention, part of the figure being shown in central vertical section.

Fig. 2, is a cross section on the line II—II of Fig. 1.

Fig. 3, is a fragmentary plan view of the feeder.

Fig. 4, is a fragmentary vertical cross section of a slightly modified construction of the feeder.

In the said drawing, where corresponding parts are identified by similar reference characters, 1 indicates short supporting legs connected in pairs by cross bars 2, and mounted upon the legs of the device which are in longitudinal alinement, are platforms 3 upon which the poultry are adapted to stand.

The platforms 3 are disposed some distance apart, and fitted between and against said platforms respectively are pairs of standards 4, the same being secured at their lower ends to the cross bars and projecting upwardly therefrom and being recessed in their inner edges at 5 to receive between them the sides of a hopper 6, extending the full length of the feeder, the ends 7 of the hopper extending downward to and upon the end cross bars 2. If desired the hopper may be divided by a series of partitions 8 into chambers 9 wherein different kinds of feed may be placed, and the lower ends of the hopper are spaced apart to provide a narrow central discharge opening 10. The hopper is provided with a hinged cover 11 and with fastening devices 12 of the type shown or of any other suitable type, for the purpose of excluding rain and snow, and also preventing poultry from entering the hopper.

Arranged directly under the hopper is a feeding shelf 13 preferably provided at its side edges with upwardly projecting beads or flanges 14 to form guards against grain or feed having a tendency to flow easily, from overflowing the sides of the shelf. In Fig. 4 the beads or flanges are numbered 14ª and are preferably in the form of strips arranged vertically at opposite sides of the shelf 13 and fastened to the inner edges of the standards 4.

For adjustably supporting the shelf, a longitudinal slide bar 15 extends through openings 16 in the end walls of the hopper, and said bar is provided with upwardly projecting pins 17 by which it can be adjusted and which also limit its longitudinal movement. The bar 15 is provided with cam blocks 18 for coöperating with depending cam blocks 19 of shelf 13, the arrangement being such that longitudinal movement of the slide bar in one direction will effect upward movement of the shelf, opposite movement of the slide bar permitting the shelf to drop downward to a lower level. This adjustment of the shelf, as stated, makes provision for regulating the volume of grain permitted to pass from the hopper onto the shelf.

Underlying the side edges of the shelf is a pair of downwardly converging deflectors 20, to catch grain falling off the shelf, the feed deflectors being secured in any suitable manner to the standards 4, and underlying the deflectors is a V-shaped trough 21, the same extending slidingly through the ends of the hopper, and also resting on a pair of strips 22, to maintain the trough in a level position when the same is being slid out of the feeder for cleansing or other purposes, as the trough will need cleansing occasionally, especially if used as a receptacle for water, as is contemplated.

As the function and operation of the various parts has been set forth in detail in connection with the reference to the construction, no recapitulation of the operation is necessary, and it will be understood that the feed trough is susceptible of modification in minor particulars without departing from the principle of construction involved or the spirit and scope of the appended claim.

I claim:

In a poultry feeder, an elevated hopper, a shelf underlying the discharge point of the hopper and provided with depending cam lugs, an endwise slidable bar mounted in the feeder below the shelf, and provided with cam lugs reversed with respect to the first-named cam lugs and adapted when the bar is slid in one direction to engage said first-named cam lugs and elevate the shelf, a trough underlying the slide bar and a pair of downwardly converging deflectors interposed between the trough and shelf and adapted to deflect feed falling from the latter onto the former.

In testimony whereof I affix my signature.

FREELAND B. ASHLEY.